(12) United States Patent
Gleadall et al.

(10) Patent No.: US 9,065,793 B2
(45) Date of Patent: Jun. 23, 2015

(54) RENDERING WEB CONTENT USING PRE-CACHING

(75) Inventors: George Gleadall, Boca Raton, FL (US); Ronnie Paskin, Ft. Lauderdale, FL (US)

(73) Assignee: CBS Interactive Inc., San Francisco, CA (US)

( * ) Notice: Subject to any disclaimer, the term of this patent is extended or adjusted under 35 U.S.C. 154(b) by 0 days.

(21) Appl. No.: 13/399,833

(22) Filed: Feb. 17, 2012

(65) Prior Publication Data

US 2012/0221932 A1 Aug. 30, 2012

Related U.S. Application Data

(63) Continuation-in-part of application No. 13/034,074, filed on Feb. 24, 2011.

(51) Int. Cl.
*G06F 17/00* (2006.01)
*H04L 29/08* (2006.01)
*G06F 17/30* (2006.01)

(52) U.S. Cl.
CPC .......... *H04L 67/02* (2013.01); *G06F 17/30873* (2013.01); *G06F 17/30902* (2013.01); *H04L 67/2847* (2013.01)

(58) Field of Classification Search
CPC ............ G06F 17/30867; G06F 17/212; G06F 17/30424; G06F 17/3053; G06F 17/30864; G06F 17/30014; G06F 17/30873; G06F 17/30876
USPC .................................. 715/205, 206, 207, 208
See application file for complete search history.

(56) References Cited

U.S. PATENT DOCUMENTS

| | | | | |
|---|---|---|---|---|
| 6,012,052 A * | 1/2000 | Altschuler et al. | | 1/1 |
| 6,141,010 A | 10/2000 | Hoyle | | |
| 6,182,122 B1 * | 1/2001 | Berstis | | 709/217 |
| 6,345,292 B1 * | 2/2002 | Daugherty et al. | | 709/214 |
| 6,519,648 B1 * | 2/2003 | Eyal | | 709/231 |
| 6,523,027 B1 | 2/2003 | Underwood | | |
| 6,526,479 B2 * | 2/2003 | Rosenzweig | | 711/133 |
| 6,654,734 B1 | 11/2003 | Mani et al. | | |
| 6,892,181 B1 * | 5/2005 | Megiddo et al. | | 705/14.41 |
| 6,947,440 B2 * | 9/2005 | Chatterjee et al. | | 370/429 |
| 7,069,418 B2 * | 6/2006 | Weiss et al. | | 712/24 |
| 7,103,594 B1 * | 9/2006 | Wolfe | | 707/706 |
| 8,725,849 B1 * | 5/2014 | Lloyd | | 709/220 |
| 2003/0088580 A1 | 5/2003 | Desai et al. | | |
| 2003/0184582 A1 * | 10/2003 | Cohen | | 345/736 |
| 2005/0022115 A1 | 1/2005 | Baumgartner et al. | | |
| 2005/0198042 A1 | 9/2005 | Davis | | |
| 2006/0047804 A1 | 3/2006 | Fredricksen et al. | | |

(Continued)

OTHER PUBLICATIONS

Phillip Tellis, "Rich, accessible pagination with unobtrusive javascript," tech.bluesmoon.info blog, 18 pages (2006), available at http://tech.bluesmoon.info/2006/02/rich-accessible-pagination-with.html.*
Non-Final Office Action mailed Jun. 21, 2012, for related U.S. Appl. No. 13/034,074, filed Feb. 24, 2011, 23 pages.
Final Office Action mailed Jan. 30, 2013, for related U.S. Appl. No. 13/034,074, filed Feb. 24, 2011, 22 pages.

(Continued)

*Primary Examiner* — Laurie Ries
(74) *Attorney, Agent, or Firm* — Mahamedi Paradice LLP

(57) ABSTRACT

A first resource is provided on a user device, the first resource including a plurality of links to other resources. At least one, but not all of the plurality of links are selected for pre-caching, and at least a portion of a second resource located by the first link is automatically cached. At least the portion of the second resource is provided in response to a designated triggering event.

20 Claims, 5 Drawing Sheets

(56) References Cited

U.S. PATENT DOCUMENTS

| | | | |
|---|---|---|---|
| 2006/0136409 A1* | 6/2006 | Leidig | 707/4 |
| 2007/0079236 A1 | 4/2007 | Schrier et al. | |
| 2007/0174258 A1* | 7/2007 | Jones et al. | 707/3 |
| 2008/0005695 A1* | 1/2008 | Ozzie et al. | 715/811 |
| 2008/0115047 A1* | 5/2008 | Petri | 715/205 |
| 2008/0163193 A1 | 7/2008 | Hayton et al. | |
| 2008/0263135 A1* | 10/2008 | Olliphant | 709/203 |
| 2009/0254572 A1 | 10/2009 | Redlich et al. | |
| 2009/0276488 A1 | 11/2009 | Alstad | |
| 2010/0306249 A1* | 12/2010 | Hill et al. | 707/769 |
| 2011/0145731 A1* | 6/2011 | Anderson et al. | 715/760 |
| 2011/0296391 A1 | 12/2011 | Gass et al. | |
| 2012/0042264 A1* | 2/2012 | Burckart et al. | 715/753 |
| 2012/0117324 A1* | 5/2012 | Solina II et al. | 711/118 |
| 2012/0180083 A1 | 7/2012 | Marcus | |
| 2012/0221931 A1* | 8/2012 | Gleadall et al. | 715/208 |
| 2012/0331137 A1* | 12/2012 | Olsen et al. | 709/224 |
| 2013/0067170 A1* | 3/2013 | Lam | 711/137 |

OTHER PUBLICATIONS

Final Office Action mailed Nov. 8, 2013, for related U.S. Appl. No. 13/034,074, filed Feb. 24, 2011, 26 pages.

Notice of Allowance mailed Mar. 11, 2014, for related U.S. Appl. No. 13/034,074, filed Feb. 24, 2011, 11 pages.

Burns, "So, You Want to Pre-Load, Huh?," HTML Goodies blog, May 12, 2010, 7 pages, available at http://www.htmlgoodies.com/tutorials/web~raphics/article.php/3480001/So-You-Want-To-Pre-Load-Huh.htm.

Gervase Markham, "Mouseover Prefetch?", May 27, 2009, 10 pages, available at http://blog.gerv.net/2009/05/mouseover_prefetch/.

StackOverflow, "Delay jQuery Hover Event?," Jan. 2009, 4 pages, http://stackoverflow.com/questions/435732/delay-jqueryhover-event.

Phillip Tellis, "Rich, accessible pagination with unobtrusive javascript," tech.bluesmoon.info blog, Feb. 21, 2006, 18 pages, available at http://tech.bluesmoon.info/2006/02/rich-accessible-pagination-with.html.

* cited by examiner

RENDERING WEB CONTENT USING PRE-CACHING

RELATED APPLICATIONS

This application is a continuation-in-part of U.S. patent application Ser. No. 13/034,074, filed Feb. 24, 2011; the aforementioned application being incorporated by reference in its entirety.

TECHNICAL FIELD

Embodiments described herein pertain to rendering web content using pre-caching.

BACKGROUND

Web browsing activity on the web places emphasis on the ability to serve user requests with speed. Increasingly, user interaction with web sites and content is measured in milliseconds. At the same time, websites are incorporating more numerous and complicated functionality. A browser may make numerous requests in order to render a page. The latency associated with the various requests increases the user wait time during when browsing.

DETAILED DESCRIPTION

Figure 1:
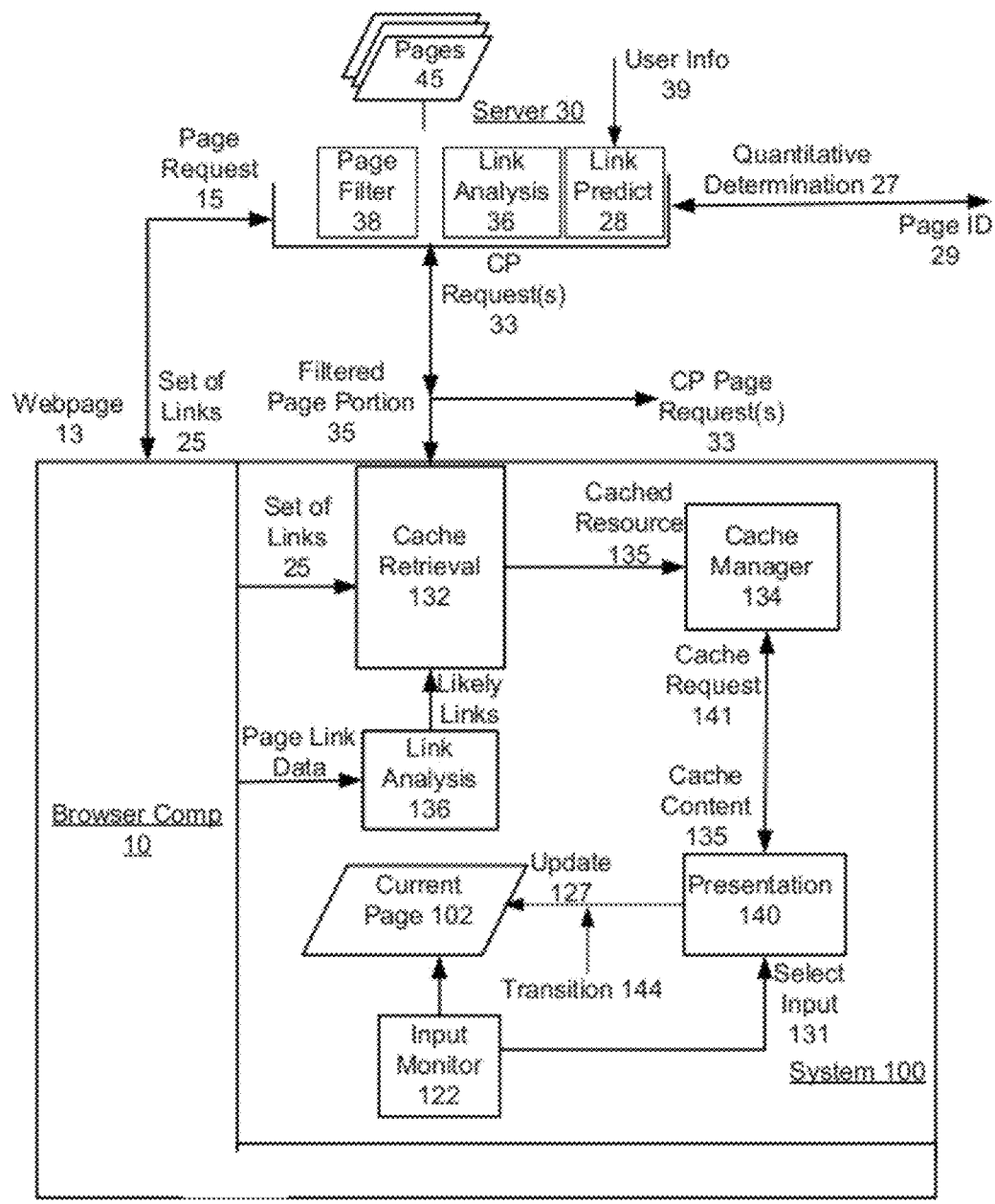
FIG. 1 illustrates a system for rendering web-resources such as web pages, according to various embodiments.

Embodiments described herein provide a system and method for presenting web page content. More specifically, embodiments provide for a browser component (or other application) to execute functionality to pre-cache web pages located by one or more links that a user is likely to select from a main page of a website.

According to embodiments, a host page is loaded by a browser running on a user computing device (e.g., personal computer, tablet, mobile computing device, etc.). The browser executes programmatic functions that asynchronously load one or more additional pages that are anticipated to be selected by the user when the user views the host page. After an additional page is selected by the user, some embodiments provide that elements of the host page are replaced by elements of the selected page, in order to transition the user into viewing content from the selected page.

According to some embodiments, in performing the transition, the host page is not replaced by the selected page. Thus, the browser does not navigate away from the hosted page after the transition occurs. Rather, the host page is altered to present content from the selected page. Among other benefits, as the selected page is not downloaded, the various requests that are executed in a page download are avoided. The result is that the user's selection of successive pages results in rapid and seamless rendering of content from those pages.

As provided by various embodiments, additional pages available through the host page are cached in anticipation of the user's selection. The caching operations may request the additional pages using complete and standard Hypertext Transfer Protocol (HTTP) requests. Thus, minimal or no configuration is needed in how the documents are asynchronously served in order to implement embodiments described. At the same time, the user is provided a seamless and highly responsive web environment from which to navigate web pages in succession.

In some embodiments, the content that is presented to the user is the hosted web page, with one or more portions that are replaced by elements that are a cached resource. As such, the user is not navigated away from the web page, but is able to view content from a selected link as an updated portion of the hosted page.

Embodiments recognize that in many web environments, users tend to navigate and toggle (e.g. select link, then select back) within a domain, where the successively presented pages carry many of the same elements. Under conventional approaches, browsers make HTTP requests to retrieve content from each page, resulting in a complete document being requested, even though much of the requested document is present on the page that is currently being displayed. According to some embodiments, a caching process is implemented to selectively retrieve web pages, located by presented links, that are similar (e.g., share many similar elements) to the presented page. When a user actually selects a link that has had its web page cached, the web page that is under presentation to the user is modified to display portions from the cached page. In particular, portions of the cached page that are not present (or are different) from the presented web page replace corresponding portions of the presented web page.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Component Description

FIG. 1 illustrates a system for rendering web-resources such as web pages, according to various embodiments. A system 100 may be implemented in connection with a user's web browsing experience in order to create a faster, richer and more fluid web browsing experience. In some embodiments, a system 100 is implemented on a user's machine as part of a browsing session. For example, a user may download a web page, and some or all of the components of the system 100 may be implemented as, for example, executed scripts (e.g., JAVACRIPT) or processes that are provided to the user's terminal through the page download.

Alternatively, some or all of the components may be implemented as permanent programming components on the user machine. For example, the user's web browser may be configured to include some or all of the functionality described. As specific examples, the user's browser can be configured with a plug-in or extension that enables some or all of the functionality described with system 100.

Among other benefits, system 100 may be implemented to create an enhanced web browsing environment. The functionality described with FIG. 1 may be implemented on the user's machine, such as in a session-based medium, to provide functionality described. In some variations, the system 100 can be extended to a server 30, which can provide some of the functionality described herein.

According to embodiments, system 100 includes components that can include input monitor 122, cache retrieval 132, cache manager 134, link analysis 136 and presentation 140. As noted herein, many of the components provided are optional, or can alternatively be implemented server-side. Moreover, while system 100 is illustrated as being a client-side system, variations provide for some or all of the components described to be provided on the server 30 (or through a service such as represented by the server 30).

In some embodiments, system 100 is implemented through execution of a browser component 10, which can include a standard commercially available web browser, such as MICROSOFT INTERNET EXPLORER, MOZILLA FIREFOX or GOOGLE CHROME. In other implementations, the browser component 10 corresponds to a web-based application, sometimes referred to as a "web-app." The browser component 10 and the components of system 100 can be executed on a computer with networking capabilities (e.g., personal computer, laptop, notebook, tablet, smart phone). In one embodiment, system 100 is implemented when the browser component 10 downloads a web page 13. The web page 13 may correspond to, for example, a home or main page for a website or domain. In this respect, the web page 13 provides links to various other resources, including internal links to resources provided from the website, as well as external links to third-party resources and advertisements. In loading a home or main page, the browser component 10 makes a page request 15 to receive the page 13 from the site. The page request 15 can be in the form of a standard Hypertext Transfer Protocol (HTTP) request, in which a full page is requested from the network site.

In an embodiment, a server 30 handles the requests 15 at the network site by providing the browser component 10 the requested page 13. According to some embodiments, the server 30 provides the added service of enabling or facilitating pre-caching by the browser component 10 by performing functions that include (i) identifying a set of links 25, provided on the requested page 13 which are identified, from quantitative or predictive analysis, as being likely to be selected, (ii) responding to page requests for caching ("cache page requests 33"), and/or (iii) filtering pages identified with the cache page requests ("filtered page portions 35"), so that the browser component 10 receives filtered or selected portions of the cache requested pages. These and other functions of server 30 are described in more detail below. While server 30 is shown and described as a single element, variations to embodiments described provide for the functionality described with server 30 to be included on multiple machines, or provided as a service.

In one embodiment, the server 30 includes a link predictor 28 that identifies (or includes an interface to a service that identifies) a set of one or more links on the page 13 that are quantitatively determined to be likely (or more likely, as compared to other links) the user's next selection after the page 13 is viewed. In one implementation, the link predictor 28 obtains a quantitative determination 27 of the set of links 25 from another service, wherein the quantitative determination 27 is based on a count or statistical analysis of which pages users in a population select after they download page 13. Thus, in one implementation, the quantitative determination 27 may be based on the count as determined from the population, rather than from any specific user. However, in variations, the quantitative determination 27 may be based on specific selections of the user in past online sessions.

Additionally, the quantitative determination 27 can be specific to the page 13, which can be identified ("page ID 29") to, for example, a service that performs the quantitative determination. For example, over a given duration (e.g. one hour, four hours, a day, a week etc.), the quantitative determination 27 can identify the top three or five links that were selected amongst the population of users that downloaded page 13. The server 30 can maintain (or use a service that maintains) identification of such a set of links for multiple or numerous pages, such as home or main pages, category pages, popular pages or other pages hosted through a given website. Each such set of links may be identified for the respective selected page, and identification of the set of links 25 can be based on the quantitative determination 27 that the corresponding link for the page is likely to be selected over some or all of the other links provided on the same page.

Still further, the quantitative determination 27 as to which links are being selected the most from a given page may be maintained in real-time. Thus, for example, the link predictor 28 can identify a newly added or suddenly popular link provided with the page 13. In this respect, an embodiment provides for the link predictor 28 to identify links that are likely to be selected next from page 13 (or other selected page) based on events, such as the occurrence of a breaking news story that is likely to garner attention.

In variations, the link predictor 28 can identify the set of links 25 in a manner that is user or profile specific. The user information 39, in the form of, for example, browsing behavior, can be monitored using, for example, a tracking cookie, or through account information (e.g., user logs in to a website). A given user may, for example, have a tendency to make a next selection from page 13 that is in accordance with a pattern. For example, if the page 13 is a home page for a sports site, the user-specific behavior can correspond to the user having a tendency to select a particular category segment (e.g., basketball), scores, or the top sports news story at the particular moment.

Still further, profile specific behavior (based on user information 39) can identify the user by category or classification. The profile specific behavior can be used to identify the set of links 25 (i.e., the one or more links that are likely to be selected from page 13) based on a category classification of the user. For example, the user can be classified as a person who has a specific interest, based on recent or past browsing history, and this determination may be used to select or influence which links are included in the set of links 25 when the user downloads the page 13.

As an addition or alternative, the server 30 may include a link analysis component 36 to (i) select, (ii) weight for or against selection, or (iii) de-select (or eliminate from selection) links (that would otherwise be selected through quantitative assessment), provided on the page 13 from the set of links 25 based on analysis of how the individual links are provided on the page 13. For example, link(s) that are most prominently positioned may be automatically included in the set of links 25, as well as links that are formatted to draw attention. Other links that, for example, do not have such formatting or positioning may automatically be excluded from the set of links 25, or alternatively be weighted against being included with the set of links 25.

The browser component 10 downloads the page 13 when its page request 15 is handled by the server 30. The browser component 10 renders the current page 102 to include the content and the data elements provided with the download of the page 13. As described below, in some embodiments, the download of the page 13 is a starter for additional page downloads through the website, the server 30, or service provided through the server 30. Accordingly, the download of page 13 can include a complete download of data provides as part of the page 13, including header information, page menus, and advertisements. Further, as described below with some embodiments, additional downloads through the set of links 25 can exclude some portions of the subsequently requested page, such as those portions that are part of the header, advertisement, or duplicative with contents of the initial download.

Some embodiments provide that the set of links 25 are identified by the server 30 for the cache retrieval component 132 at the initial download. In such implementations, the browser component 10 renders the page 13, identifies the set of links 25 during the download or rendering process, and enables the cache retrieval 132 to perform cache page requests 33 using the links in the set of links 25. The cache retrieval 132 can be provided by, for example, a background or invisible instance of the browser.

In variations to embodiments described, the cache retrieval component 132 can effectively be provided by processes that run on the server 30. Thus, with the initial download, the browser component 10 receives additional content or data corresponding to pages located by individual links in the set of links 25.

As described below, some embodiments provide that the pages provided through cache retrieval 132 (whether implemented on the client or on the server 30) can be filtered to exclude some information or content, such as the header, navigation menus or advertisements.

The results of implementing cache retrieval 132 include receipt of filtered pages 35. In one embodiment, the cache retrieval 132 executes through the browser component 10 (e.g., as a background instance of the browser). The cache page requests 33 are made by the cache retrieval 132 through the server 30. The server 30 includes a filter 38 that filters the pages 45 (which can also be hosed through the server 30) that are to be returned to the browser component 10. Accordingly, the server 30 may return the filtered pages 35 (based on pages 45) to the cache retrieval 132, where they are stored in cache as cached resources 135.

In alternative implementations, the cache retrieval 32 can receive the pages of the cache page request 33 without filtering by the server 30. For example, the cache page requests 33 may be communicated to domains that are not handled by the server 30. In such variations, cache retrieval 132 may filter the returned pages, or alternatively store the returned pages in their entirety in the cache. Still further, variations provide for cache page requests that are handled by external domains to be processed through the server 30. For example, the server 30 can act as a proxy for the cache retrieval 132.

The cache manager 134 includes functionality for utilizing the cached resources 135. In an embodiment, the cache manager 134 responds to events in which one or more of the cache resources 135 are to be rendered, or partially rendered. In one implementation, a designated event for triggering the cache manager 134 to retrieve a cached resource 135 includes the user selecting one of the links in the set of links 25. In a variation, the designated event can correspond to the user hovering a pointer over one of the links in the set of links 25. Still further, the designated event can correspond to a designated user action that is deemed to indicative of a user intent to select one of the links in the set of links 25.

In an embodiment, an input monitor 122 is provided to monitor the user's interaction with the current page 102, in order to detect occurrence of the designated action. When the designated action occurs (e.g., user selects one of the links in the set of links 25), an embodiment provides that the presentation 140 substitutes portions of the current page 102 with corresponding portions of a selected one of the cached resources 135 (e.g., the cached resource corresponding to the most frequently selected link on the current page). In one implementation, the presentation component 140 responds to the designated action (e.g., selection input 131) by making request 141 to the cache manager 134, which in turn provides the presentation 140 with cached resource 135, corresponding to the portion of the cached page which is to be substituted into the current page 102. The presentation component updates 127 the current page 102 using the cached resource 135. In one embodiment, the update 127 substitutes portions of the current page 102 that excludes the header, the menu navigation for the page, and/or the advertisement. Such an embodiment may assume that internal pages of, for example, a home or main page utilize the same navigation menu header. Thus, substitution in the cached resource 135 in place of corresponding portions of the current page 102 provides the appearance of a new page to the user, without actually substituting the entire page. FIG. 3A and FIG. 3B illustrate an example of a page that is updated using cached content, such as described by embodiments herein.

While some embodiments provide for the designated action to correspond to a user's selection of a link, system 100 can be configured to respond to other designated actions, including other forms of user interaction. Depending on the implementation, the user interaction may include (i) selection input, where the user selects or acts on a feature of the current page such as a link; (ii) cursor movement, which can result in mouse-over's or link hovering, and (iii) pausing for short durations (e.g., 300 ms). The latter, in connection with mouse-over's or link hovering, may signify user intent to select a particular link (prior to the user actually making the selection).

Still further, some embodiments provide for the set of links 25 to be restructured when rendered as part of the current page 102 so as to be responsive to actions other than direct user selection. For example, the set of links 25 can be restructured to be responsive to mouse-overs, hovers or other actions of the user.

In some variations, the client (e.g., browser component 10) can include a programmatic component for performing analysis on the links provided with the page 13. For example, a link analysis component 136 can identify one or more links provided with the page 13 to perform caching operations on. The link analysis 136 can identify the links based on, for example, user profile analysis which identifies domains or links of frequent interest to the user. In this way, the link analysis 136 can identify some or all of the links in the set of links 25 which are subjected to the caching operation.

In one embodiment, the presentation component 140 makes the cached request 141 in response to a trigger such as passage of time, page load of the current page, or user input. In response to the trigger, the presentation component 140 automatically replaces some elements of the current page 102 with elements of one of the cached resources 135. For example, a content portion of the current page 120 may be replaced by the content portion of the cached resource 135.

As an alternative or variation, the presentation component 140 may also compare the elements of the current page 102 to elements of the selected cached resource 135 in order to identify what elements are different. For at least some of the elements that are different, the presentation component 140 implements the update 127 to replace portions of the current page 102 with portions of the selected cached resource 135 which are deemed to be different.

In one embodiment, the presentation component 140 determines differences between the current page 102 and the cached resource 135 based on a Document Object Model (DOM). Specifically, DOM elements of the current and cached page 132 may be compared under the assumption that the two pages are similar. Those elements that are different may be replaced on the current page 102 with corresponding elements on the cached resource 135. For example, the portions of the cached resource 135 which are integrated into the current page 120 may include content elements, but not headers or footers.

Still further, in order to identify what portions of the current page 102 are to be replaced, the presentation component 140 may utilize taxonomy of the current page 102. In one implementation, the taxonomy identifies DOM elements of the current page 102, which can be compared to corresponding elements of the cached resource 135.

According to an embodiment, the current page 102 can be updated repeatedly to include elements of successive page requests made by the user. While a full page request may be made for a next page (and successive pages thereafter), one or more of the next page requests may actually be interpreted as requests for corresponding cache resources 135. Portions of the cached resources 135 may be integrated into the current page when user input selects the page for viewing. The result is that the pertinent portions of what would constitute the next page (but for being cached) are integrated into the current page 102 seamlessly, and quickly as compared to conventional web browsing methods. Duplicative portions of the next page, can be omitted in the update to the current page 102.

In order to indicate to the user that transition has occurred (and the current page 102 displays contents from the next page), one or more embodiments may incorporate a transition feature 144 as part of the update 127 to the current page. The transition feature 144 may be rendered to signify to the user that pertinent portions of the next page are now integrated into the current page 102. For example, in one implementation, the transition feature 144 corresponds to a darkened or colored screen (e.g., blue screen) which appears and fades quickly. The transition feature 144 may be triggered with the page update 127 to the current page 102.

Among other benefits, the current page 102 may be maintained in the user's browsing session, even after the user has selected to view additional pages (and content from those pages have been displayed). Some embodiments recognize that as a result of maintaining the current page 102 loaded in the browser, additional functionality and services may be integrated into the user's browsing experience. For example, the current page 102 may be equipped with push services that take several minutes to load and/or appreciate by the user. Under conventional approaches, users are likely to navigate from a website's main page within a short time span (e.g., seconds), precluding use of push or enhanced services. Under an embodiment such as described with FIG. 1, the current page is loaded and maintained in the web browser. The duration of the current page's presence with the browser is significantly longer, making push and other enhanced services feasible to establish on the current page.

Methodology

Figure 2A:
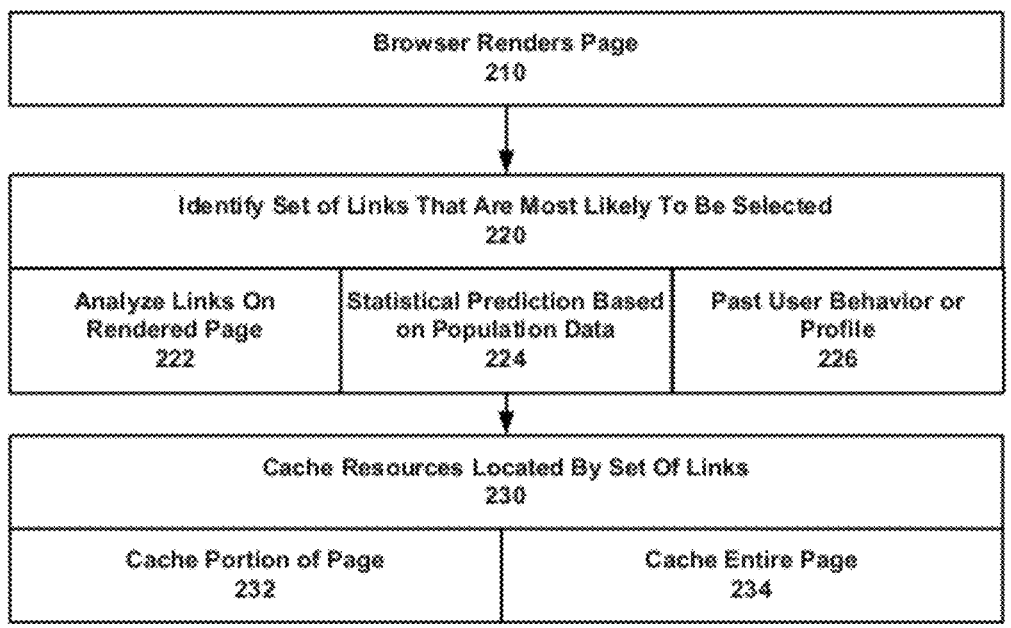
FIG. 2A illustrates a method for pre-caching links provided on a web page, according to still another embodiment.

FIG. 2A illustrates a method for pre-caching links provided on a web page, according to still another embodiment. In describing a method of FIG. 2A, reference may be made to elements of FIG. 1 for purpose of illustrating suitable elements or components for performing a step or sub-step being described.

With reference to FIG. 2A, a browser component 10 of the user renders a page, such as a home page of a frequently visited website by the user. In an embodiment, the rendering of the web page from the particular website triggers functionality such as described herein, or by a system of FIG. 1. For example, the system 100 may be integrated as a plug-in that is provided from a website through scripting, or alternatively loaded into the web page and configured to trigger when the user accesses a particular website (210).

When system 100 is triggered, a set of links are identified which are deemed to be links that are likely to be selected from the downloaded page (sometimes referred to as "hot links") (220). For example, a given web page can include links to stories about a specific topic, links to category-specific content internal to the web page, advertisement links, and links to user-generated content. From the set of links provided, some embodiments select the set of links from any link on the page. In variations, the set of links are selected from links that are of a particular kind (e.g., unsecure link, category link, link to stories), or link to content that is of a particular type. Still further, the set of links may exclude certain kinds of links, such as advertisement links.

The determination as to which links on the web page are selected may be made by a server or service, on the user terminal (e.g., browser), or by both server and user terminal.

In one embodiment, the set of links are selected from other links in the page based on an analysis of the links (222). The analysis can be based on, for example, text, metadata or context provided with the link. The analysis may be performed by the server or by the user terminal. For example, one or both of the server or client link analysis components 36, 136 can implement rules to identify which links to select for pre-caching. The rules include pre-caching links that link to a particular type of content (e.g., news story), links that are fresh, or links that are prominently placed (e.g., up front).

As an alternative or addition, the set of links can be identified from a statistical analysis performed over a group or population of users (224). For example, a service may be used that monitors or tracks the links that users generally select from a particular website. The service may statistically identify which links the user is likely to select based on what other users in the population select. The statistical analysis can be based on, for example, parameters such as (i) the general population, with no discernment, (ii) users of the population that share classification or a particular demographic characteristic or behavior (e.g., frequent web user), (iii) session data reflecting parameters of the user's current browsing history, as compared to other user's, and/or (iv) time of day or week. Still further, the statistical analysis can optionally be specific to the particular domain, webpage or network location, so that the statistical analysis performed for one site may yield different results than that of another site.

Still further, the set of links may be identified from past user behavior, or from the user profile (226). For example, system 100 may include intelligence to identify a commonality in the type of pages the user typically selects, or selects when visiting the web page that triggered the functionality. Thus, for example, system 100 may include the link analysis component 136 that stores some historical data about past user behavior, which can be specific to the website, domain or other parameter. From the historical data, the link analysis component 136 can identify links that the user is likely to select next after downloading the current page 102.

Once the set of links are identified, the pages located by the links can be cached. In an embodiment, the cached resource corresponds to a portion of a page that is located by individual links in the identified set. For example, the cached resource corresponds to portions of the page that exclude advertisement, menus and header information (232). As an alternative or variation, the cached resource corresponds to the entire page located by the individual links in the identified set of links (234).

Figure 2B:
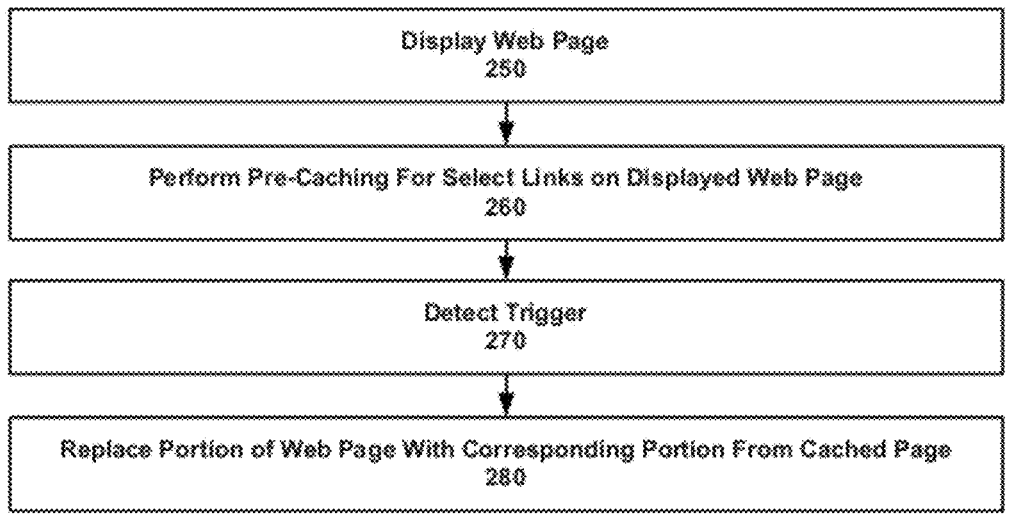
FIG. 2B illustrates a method for updating a web page with elements provided by another page that has been pre-cached, according to an embodiment.

FIG. 2B illustrates a method for updating a web page with elements provided by another page that has been pre-cached, according to an embodiment. A method such as described by an embodiment of FIG. 2B may be implemented using, for example, a system such as described with an embodiment of FIG. 1. Accordingly, reference may be made to elements of FIG. 1 for purpose of illustrating a suitable element or component for performing a step or sub-step being described.

According to an embodiment, browser component 10 may display a web page 250 that is associated with resources or functionality for performing pre-caching on select links (250) provided with the page. Pre-caching is performed on one or more links provided on the page (260), using, for example, a method such as described by an embodiment of FIG. 2A, or elsewhere in this application.

After the browser component 10 displays the page, a trigger is detected (270). The trigger can correspond to one or more of the following: (i) passage of time, (ii) user action that is indicative of user interest, such as a hover or mouse-over, and/or (iii) user selection of the link.

In an embodiment, system 100 responds to the trigger by replacing a portion of the displayed web page with a corresponding portion of one of the pre-cached pages (280). The pre-cached page that is selected may correspond to the one that is subject to the user action (e.g., hover or mouse-over) or to the user-selection. If passage of time is used as the trigger and multiple pre-cached pages exist, a predetermined rule may be used to select which pre-cached page is to be displayed to the user.

In an embodiment, only a portion of the pre-cached page is displayed to the user. As described with, for example, an embodiment of FIG. 2A, portions of the page(s) that is cached can be filtered to remove elements, particularly elements that require relatively large amounts of data. For example, a content portion of the displayed page can be replaced with a content portion of the cached page. The portions of the page that can be filtered out or otherwise removed include header, advertisement, or menu.

Figure 3:
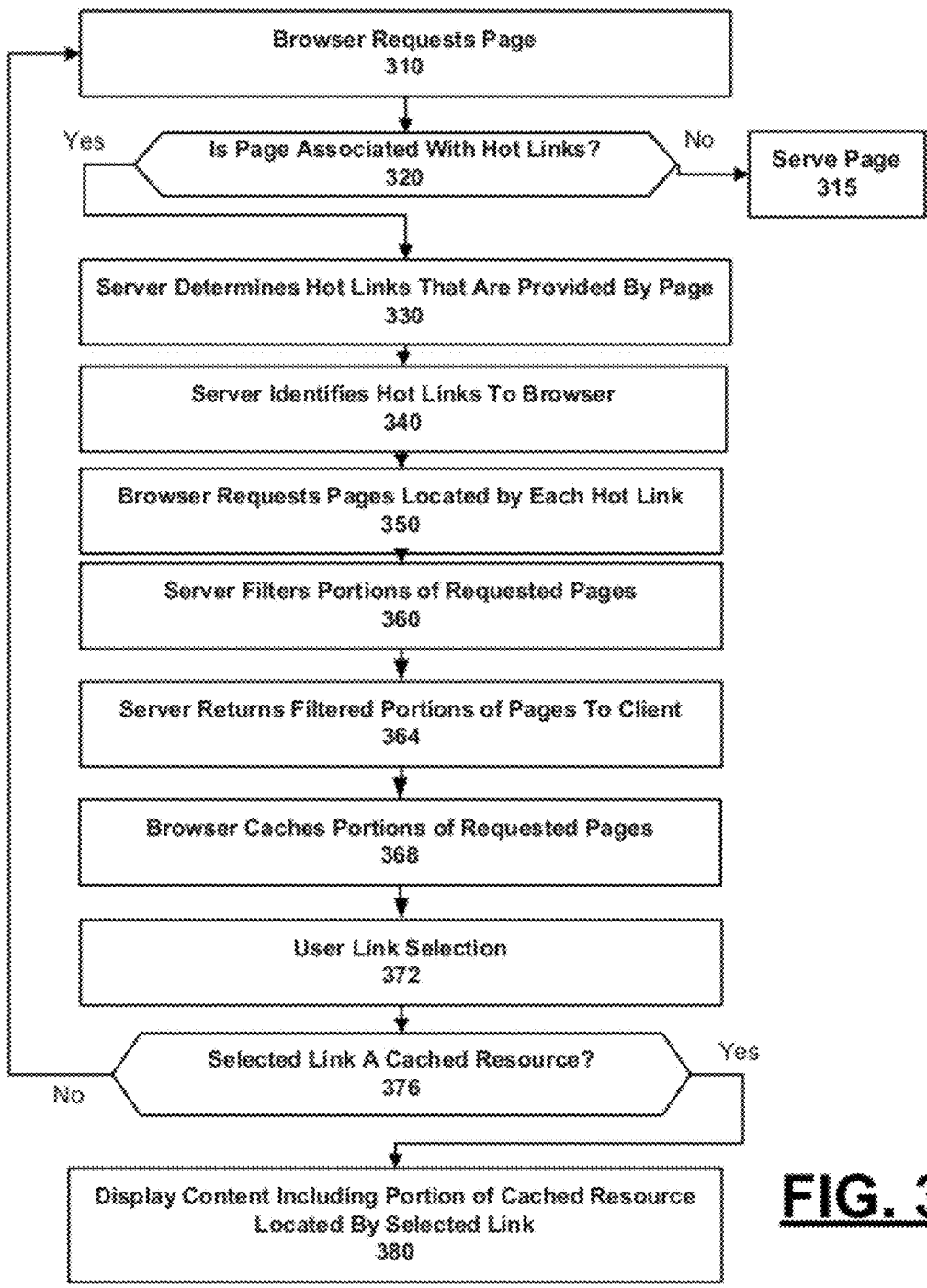
FIG. 3 illustrates a method for using pre-caching to seamlessly display content from multiple web pages, under an embodiment.

FIG. 3 illustrates a method for caching select links of a web page in presenting web page content, according to one or more embodiments. In describing a method of FIG. 3, reference may be made to elements of FIG. 1 for purpose of illustrating suitable elements or components for performing a step or sub-step being described.

With reference to FIG. 3, a user may operate a computer in order to implement a page download. For example, a browser component 10 may request a specific page from a website (310). The browser component 10 may be configured or equipped with functionality such as provided by system 100 of FIG. 1. For example, the functionality may be provided by way of a plug-in. In some implementations, the page download may correspond to the user downloading a home page or main page of a website.

According to an embodiment, the page download is performed through a server 30 or service that makes a determination as to whether the requested page is associated with a set of hot links-links that are likely selected when presented to the user (320). If no hot links are identified, then the page download is conventional (315). Otherwise, the server 30 determines the hot links of the requested page (330). The determination of what links are hot may be based on a statistical analysis performed on a population of users. Alternatively, the determination of what links are hot may be based on past user-specific tendencies, such as user's past behavior as to what pages or domains or typically selected. Such determinations can be made by tracking the user using tracking cookies or through user behavior after the user logs in.

In one embodiment, the server 30 identifies the hot links to the browser component 10 (340). The browser component 10 then makes page requests for pages located by each of the hot links (350). The browser component 10 requests may be made automatically, in response to the original page download. In an embodiment, the server 30 (or other programmatic component) filters the pages that are retrieved in response to the requests specified from the hot links (360). The filtering can remove, for example, portions of the page corresponding to the header and advertisements (which can add significant data size to the file for the page). The server 30 may then return portions of the requested pages that have been filtered (364). In variations, the filtering is performed on the user terminal by, for example, the user browser or plug-in. The browser component 10 then caches portions of the requested pages as cached resources 135 (368).

A link selection may be detected through the browser component 10, indicating a user's intent to retrieve another page from the current page (372). In variations, embodiments may recognize other events to select a next page (from which cached resources 135 are displayed). Such events can be signified by, for example, the passage of time after the original page with is downloaded. Alternatively, such events can be signified by, for example, a user pre-selection action (e.g., user mouses over a link); see U.S. patent application Ser. No. 13/034,074, which is incorporated in its entirety by reference herein.

A determination is made as to whether the selected link locates a corresponding cached resource 135 (376). If a cached resource 135 is located by the selected link, then the content displayed includes portions of the cached resource 135 located by the selected link (380). Otherwise, the selected page may be evaluated to determine whether it is associated with hot links (320).

According to embodiments, methods such as described by embodiments of FIGS. 2A, 2B and 3 can be implemented selectively on a user terminal. For example, methods such as described by FIGS. 2A, 2B and 3 can be performed selectively, in response to conditions such as relatively slow network bandwidth or user preference. In some implementations, select links may be pre-cached, but the determination to utilize pre-cached web pages (or portions thereof) as opposed to the corresponding live page may be based on network bandwidth or browsing speed (e.g., ability for terminal to display web pages in succession).

Figure 4A:
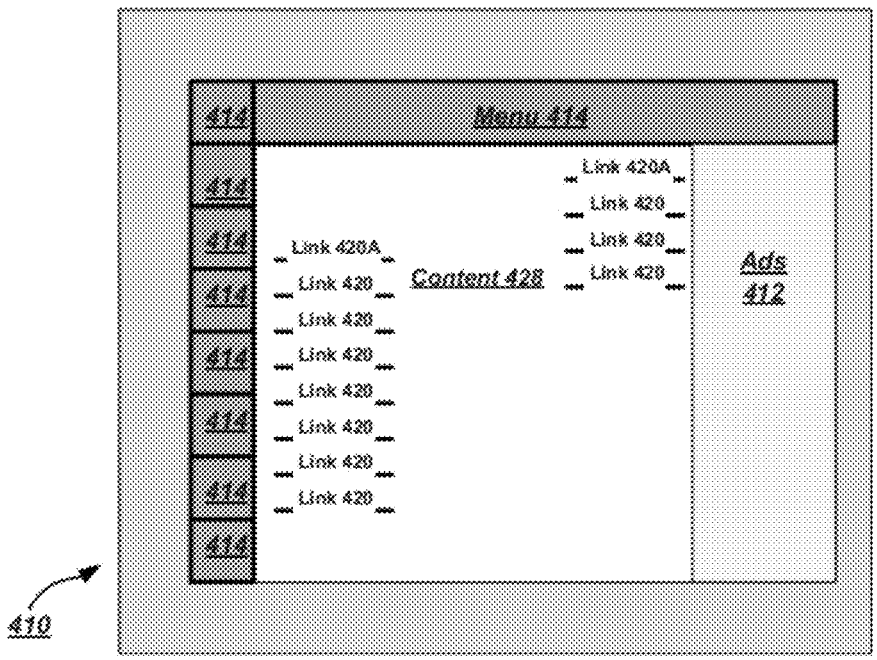
FIG. 4A and FIG. 4B illustrate examples of web pages in which embodiments such as described can be implemented.
Figure 4B:
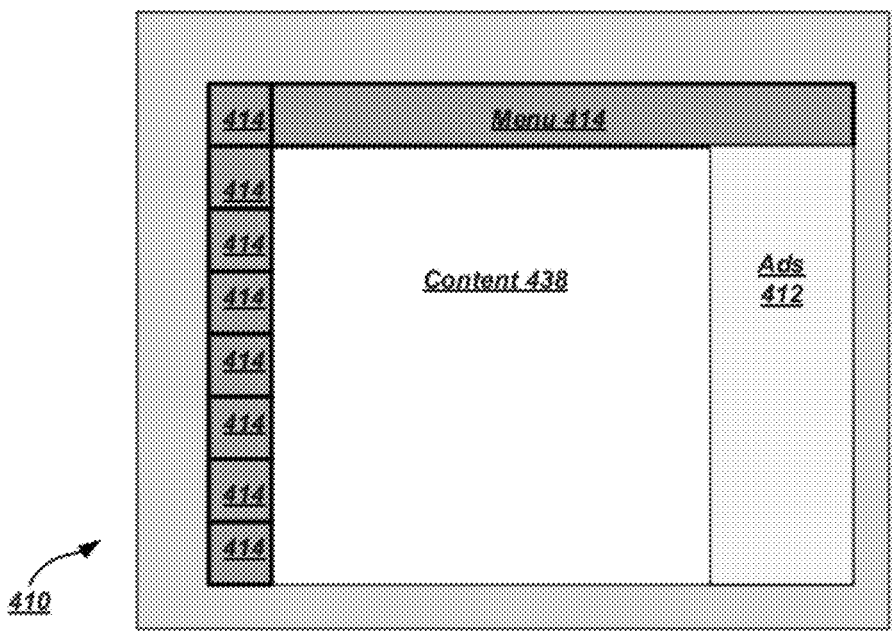

FIG. 4A and FIG. 4B illustrate examples of web pages in which embodiments such as described can be implemented. In FIG. 4A, a web page 410 is provided that can correspond to, for example, a home page or topical page. The web page 410 includes numerous links 420 to various kinds of content. Furthermore, the web page 410 can be rendered to include elements such as advertisements 412, menus 414 and header 416. A select set 420A of the links 420 displayed on the web page 410 may be pre-identified as, for example, "hot links" or links that are likely to be selected next, once the web page 410 is displayed. The user terminal may (e.g., using a browser plug-in) access and cache the resource located by the individual links in the selected set 420A.

In response to a trigger, such as a user selection of one of the links 420, a portion of the resource located by the selected link replaces select portions of the web page 410. For example, the cached page may include only a content portion 438 that replaces a corresponding content portion 428 of the displayed web page 410. Some elements, such as advertisements 412, menus 414 and header 416 may be maintained from the first web page 410. The result is that the user can have a relatively fast web browsing experience, in that many data intensive portions of the next web page are not downloaded or displayed on the user terminal.

Computer System

Figure 5:
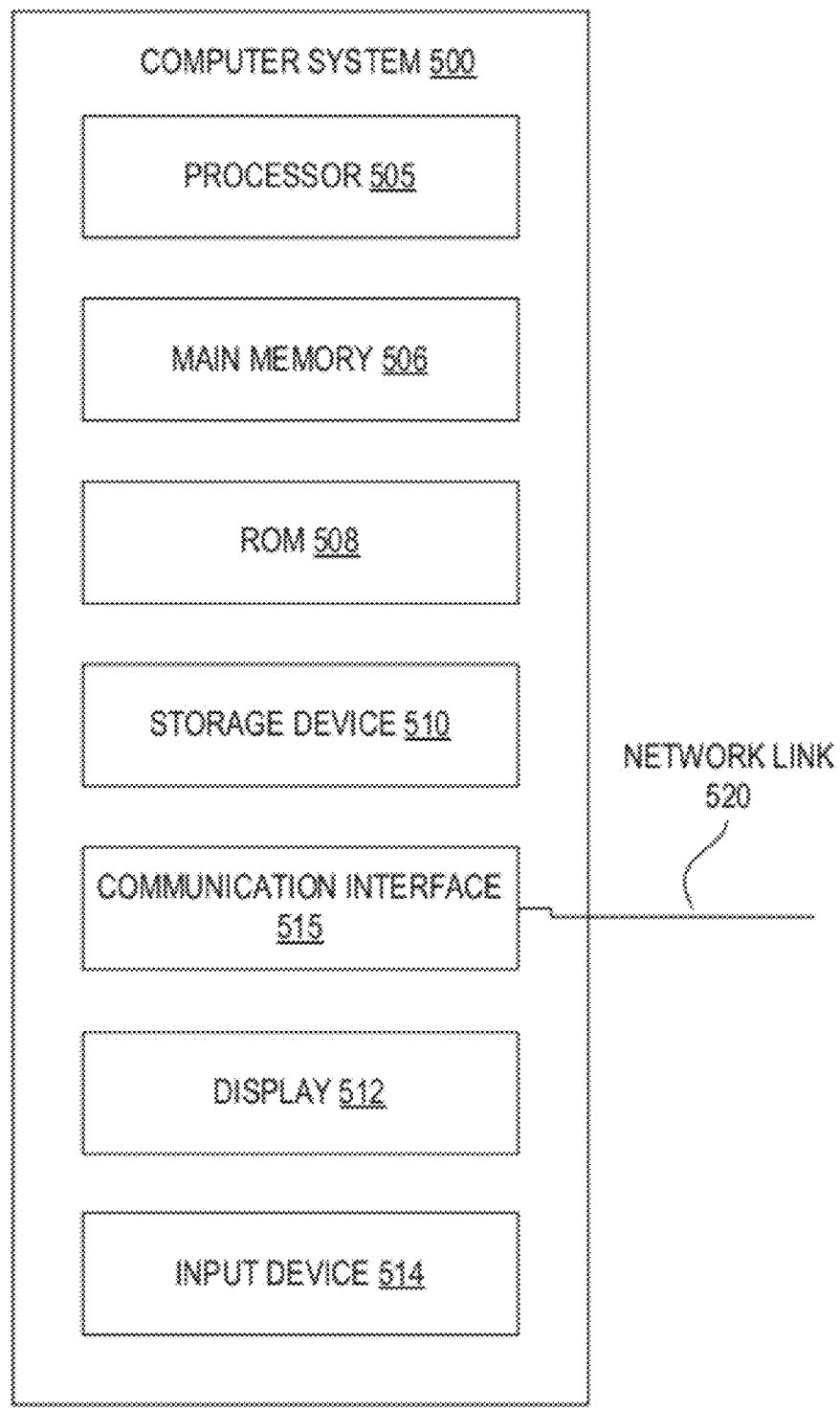
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, system 100 may be implemented using a computer system such as described by FIG. 5.

In an embodiment, computer system 500 includes processor 505, main memory 506, ROM 508, storage device 510, and communication interface 518. Computer system 500 includes at least one processor 505 for processing information. Computer system 500 also includes a main memory 506, such as a random access memory (RAM) or other dynamic storage device, for storing information and instructions to be executed by processor 505. Main memory 506 also may be used for storing temporary variables or other intermediate information during execution of instructions to be executed by processor 505. Computer system 500 may also include a read only memory (ROM) 508 or other static storage device for storing static information and instructions for processor 505. A storage device 510, such as a magnetic disk or optical disk, is provided for storing information and instructions. The communication interface 518 may enable the computer system 500 to communicate with one or more networks through use of the network link 520.

Computer system 500 can include display 512, such as a cathode ray tube (CRT), a LCD monitor, and a television set, for displaying information to a user. An input device 515, including alphanumeric and other keys, is coupled to computer system 500 for communicating information and command selections to processor 505. Other non-limiting, illustrative examples of input device 515 include a mouse, a trackball, or cursor direction keys for communicating direction information and command selections to processor 505 and for controlling cursor movement on display 512. While only one input device 515 is depicted in FIG. 5, embodiments may include any number of input devices 514 coupled to computer system 500.

Embodiments described herein are related to the use of computer system 500 for implementing the techniques described herein. According to one embodiment, those techniques are performed by computer system 500 in response to processor 505 executing one or more sequences of one or more instructions contained in main memory 506. Such instructions may be read into main memory 506 from another machine-readable medium, such as storage device 510. Execution of the sequences of instructions contained in main memory 506 causes processor 505 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for rendering web content on a computing device, the method being implemented by one or more processors and comprising:
    detecting a download of a current webpage;
    identifying, on the current webpage, a plurality of links to respective resources;
    determining, for each of the plurality of links, a number of user selections made by a population of users over a given duration;
    based on the determined number of user selections, automatically caching content from one or more of the respective resources corresponding to one or more of the plurality of links having a higher number of user selections with respect to a remainder of the plurality of links;
    detecting a user action indicative of a desire to view content from a specified resource from the one or more respective resources; and
    in response to detecting the user action, altering a plurality of portions of the current webpage to display the cached content from the specified resource without navigating away from the current webpage.

2. The method of claim 1, further comprising:
    restructuring the one or more links, having the higher number of user selections with respect to the remainder links, to be triggerable, upon the user action, to display the cached content corresponding to the one or more links without navigating away from the current webpage.

3. The method of claim 2, wherein the user action corresponds to a user hover-over on a specified link, from the one or more links, corresponding to the specified resource.

4. The method of claim 1, wherein the plurality of links have a common network domain with respect to the current webpage.

5. The method of claim 4, wherein the cached content corresponds to portions of the respective resources that are different from content displayed on the current webpage.

6. The method of claim 5, wherein displaying the cached content from the specified resource comprises replacing only differing portions of the current webpage with the cached content from the specified resource.

7. The method of claim 1, further comprising:
identifying one or more most prominently displayed links from the plurality of links; and
automatically caching content from the respective resources corresponding to the one or more most prominently displayed links.

8. The method of claim 1, further comprising:
identifying browsing behavior, by a user of the computing device, indicating a category in which the user is likely to browse;
based on the browsing behavior, identifying one or more relevant links, from the plurality of links, relevant to the category; and
automatically caching content from the respective resources corresponding to the one or more relevant links.

9. The method of claim 1, wherein the user action corresponds to a user selecting a specified link, from the plurality of links, corresponding to the specified resource.

10. The method of claim 1, wherein the method is executed via a browser plug-in.

11. The method of claim 1, wherein the population of users are determined by the one or more processors to share a predetermined characteristic with a user of the computing device.

12. A non-transitory computer readable medium storing instructions for rendering web content on a computing device, wherein the instructions, when executed by one or more processors, cause the one or more processors to perform operations comprising:
detecting a download of a current webpage;
identifying, on the current webpage, a set of links to respective resources;
determining, for each of the set of links, a number of user selections made by a population of users over a given duration;
based on the determined number of user selections, automatically caching content from one or more of the respective resources corresponding to one or more of the set of links having a higher number of user selections with respect to a remainder of the set of links;
detecting a user action indicative of a desire to view content from a specified resource from the one or more respective resources; and
in response to the user action, altering a plurality of portions of the current webpage to display the cached content from the specified resource without navigating away from the current webpage.

13. The non-transitory computer readable medium of claim 12, wherein the instruction, when executed by the one or more processors, cause the one or more processors to perform further operations comprising:
restructuring the one or more links, having the higher number of user selections with respect to the remainder links, to be triggerable, upon the user action, to display the cached content corresponding to the one or more links without navigating away from the current webpage.

14. The non-transitory computer readable medium of claim 13, wherein the user action corresponds to a user hover-over on a specified link, from the one or more links, corresponding to the specified resource.

15. The non-transitory computer readable medium of claim 12, wherein the set of links have a common network domain with respect to the current webpage.

16. The non-transitory computer readable medium of claim 15, wherein the cached content corresponds to portions of the respective resources that are different from content displayed on the current webpage.

17. The non-transitory computer readable medium of claim 16, wherein displaying the cached content from the specified resource comprises replacing only differing portions of the current webpage with the cached content from the specified resource.

18. The non-transitory computer readable medium of claim 12, wherein the instructions, when executed by the one or more processors, cause the one or more processors to perform further operations comprising:
identifying one or more most prominently displayed links from the set of links; and
automatically caching content from the respective resources corresponding to the one or more most prominently displayed links.

19. The non-transitory computer readable medium of claim 12, wherein the instructions, when executed by the one or more processors, cause the one or more processors to perform further operations comprising:
identifying browsing behavior, by a user of the computing device, indicating a category in which the user is likely to browse;
based on the browsing behavior, identifying one or more relevant links, from the set of links, relevant to the category; and
automatically caching content from the respective resources corresponding to the one or more relevant links.

20. The non-transitory computer readable medium of claim 12, wherein the user action corresponds to a user selecting a specified link, from the set of links, corresponding to the specified resource.

* * * * *